United States Patent
Floyd, III et al.

(10) Patent No.: US 12,126,516 B2
(45) Date of Patent: Oct. 22, 2024

(54) TECHNIQUES FOR DNS ECOSYSTEM HEALTH CHECKS

(71) Applicant: DISNEY ENTERPRISES, INC., Burbank, CA (US)

(72) Inventors: Robert K. Floyd, III, Clermont, FL (US); Esther M. Betancourt, Clermont, FL (US); Jeffrey Sol Mansukhani, La Crescenta, CA (US); James Reed Philpott, Seattle, WA (US); Daniel Eric Ouellette, Monrovia, CA (US); Sankara Subramanyam, Ashburn, VA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 18/082,185

(22) Filed: Dec. 15, 2022

(65) Prior Publication Data
US 2024/0205128 A1 Jun. 20, 2024

(51) Int. Cl.
*H04L 43/50* (2022.01)
*H04L 41/0869* (2022.01)
*H04L 43/0817* (2022.01)

(52) U.S. Cl.
CPC .......... *H04L 43/50* (2013.01); *H04L 41/0869* (2013.01); *H04L 43/0817* (2013.01)

(58) Field of Classification Search
CPC .. H04L 43/50; H04L 41/0869; H04L 43/0817
USPC ....................................................... 709/224
See application file for complete search history.

(56) References Cited

U.S. PATENT DOCUMENTS

| | | | |
|---|---|---|---|
| 2005/0160335 A1* | 7/2005 | Peterson ............. | H04L 41/0681 714/724 |
| 2007/0192474 A1* | 8/2007 | Decasper ............. | H04L 67/306 709/223 |
| 2009/0013210 A1* | 1/2009 | McIntosh ............ | H04L 41/0661 714/E11.113 |
| 2009/0119402 A1* | 5/2009 | Shull ...................... | H04L 61/30 709/224 |
| 2009/0240792 A1* | 9/2009 | Ren ...................... | H04L 61/5014 709/221 |
| 2010/0223621 A1* | 9/2010 | Joshi .................... | H04L 61/4511 709/245 |
| 2018/0336109 A1* | 11/2018 | Huang ................ | H04L 61/4511 |
| 2019/0014088 A1* | 1/2019 | Subramaniyan .... | H04L 63/0281 |
| 2021/0288937 A1* | 9/2021 | Vijayvargiya ........ | H04L 63/101 |
| 2022/0263788 A1* | 8/2022 | Lee ..................... | H04L 61/4541 |

\* cited by examiner

*Primary Examiner* — Meng Vang
(74) *Attorney, Agent, or Firm* — Squire Patton Boggs LLP; Sarah Mirza

(57) ABSTRACT

Various embodiments set forth systems and techniques for identifying issues associated with a domain name system (DNS) ecosystem. The techniques include receiving a first target domain name; identifying a plurality of DNS elements included in the DNS ecosystem that should be tested based on the first target domain name; performing one or more validation operations on the plurality of DNS elements based on the first target domain name to generate a first set of validation results; and identifying a first DNS issue associated with the first target domain name based on the first set of validation results.

20 Claims, 6 Drawing Sheets

TECHNIQUES FOR DNS ECOSYSTEM HEALTH CHECKS

BACKGROUND

Field of the Various Embodiments

Embodiments of the present disclosure relate generally to computer science and computer networks and, more specifically, to techniques for DNS ecosystem health checks.

Description of the Related Art

Domain name system (DNS) is a hierarchical naming system that is used to map domain names to the network addresses of various devices and/or services available via a network. The DNS is maintained using a distributed database system, where different servers manage information associated with different domain names. In some cases, rather than providing a network address associated with a domain name, a server provides an address or other pointer to a different server (e.g., name server delegations, zone transfers, DNS forwarding, and/or the like). When a client application makes a request that includes a domain name, a DNS resolver iteratively sends requests to various DNS servers, following any pointers provided by a DNS server, in an attempt to find the network address corresponding to the requested domain name. If a result is found, the DNS resolver provides the result to the client application. However, a result may not be successfully found if there are issues with the DNS ecosystem, such as the DNS servers not having the information associated with the requested domain name or the information provided by a DNS server being incorrect or out of date. Such issues can cause devices, websites, web services, and/or the like that are associated with the requested domain name to be unavailable or inaccessible to the client application.

One approach for discovering issues within the DNS ecosystem is by testing multiple domain names to determine whether any domain name requests do not successfully return a result. If a result is not successfully returned for a given domain name, then a network administrator could be notified that there is an issue with at least one DNS server associated with the given domain name. However, because this approach relies on determining whether a result is successfully returned for each domain name, the approach is unable to discover issues before they occur. For example, multiple servers could include network address information for a given domain name. If at least one server is accessible to a device that is testing the given domain name, then the test will succeed, even if the other servers have failed (e.g., are unavailable or inaccessible). Accordingly, an issue would not be detected until all of the servers have failed, thereby missing the opportunity to address the issue when only a subset of the servers have failed. Additionally, this approach determines only that an issue is causing a given domain name to not be resolved into a network address, but cannot identify the specific components, or all of the components, of the DNS ecosystem that are associated with the issue (e.g., which servers have failed or which servers provided incorrect information).

Another approach is to manually check the servers within the DNS ecosystem and the network address information contained within each server and validate that each server is available and contains accurate, up-to-date information. However, the DNS ecosystem includes a large number of servers that each contain a large amount of information. Manually checking each server would require an impossibly large amount of time and/or number of people to complete. In addition, the servers and the information contained within each server are constantly changing. As a result, even if such a manual check were performed, due to the amount of time needed to perform the check and the dynamic nature of the DNS ecosystem, the results of such a test would be quickly out of date. For example, by the time the last server has been validated, the first server that was checked could have failed or the information included in the first server could have become out of date.

As the foregoing illustrates, what is needed in the art are more effective techniques for identifying issues within a DNS ecosystem.

SUMMARY

One embodiment of the present disclosure sets forth a computer-implemented method for identifying issues associated with a domain name system (DNS) ecosystem. The method includes receiving a first target domain name; identifying a plurality of DNS elements included in the DNS ecosystem that should be tested based on the first target domain name; performing one or more validation operations on the plurality of DNS elements based on the first target domain name to generate a first set of validation results; and identifying a first DNS issue associated with the first target domain name based on the first set of validation results.

At least one technical advantage of the disclosed techniques relative to the prior art is that, using the disclosed techniques, issues associated with a DNS ecosystem are identified more efficiently and accurately. In particular, by generating a list of DNS ecosystem elements (e.g., servers, server configurations, and network address information) that are associated with a set of target domain names, the portion of the DNS ecosystem associated with the set of target domain names can be quickly identified and validated to determine whether there are any issues within the DNS ecosystem associated with the set of target domain names. Furthermore, because individual elements are being validated, a health check server is able to identify specific elements that are associated with an issue or potential issue. Accordingly, using the disclosed techniques, a health check server is able to pre-emptively identify issues within the DNS ecosystem, even when results are being successfully returned for a target domain name. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Domain name system (DNS) is a hierarchical naming system that is used to map domain names to the network addresses of various devices and/or services available via a network. A DNS ecosystem includes many different DNS servers, where each server manages information associated with one or more different domain names.

Figure 1:
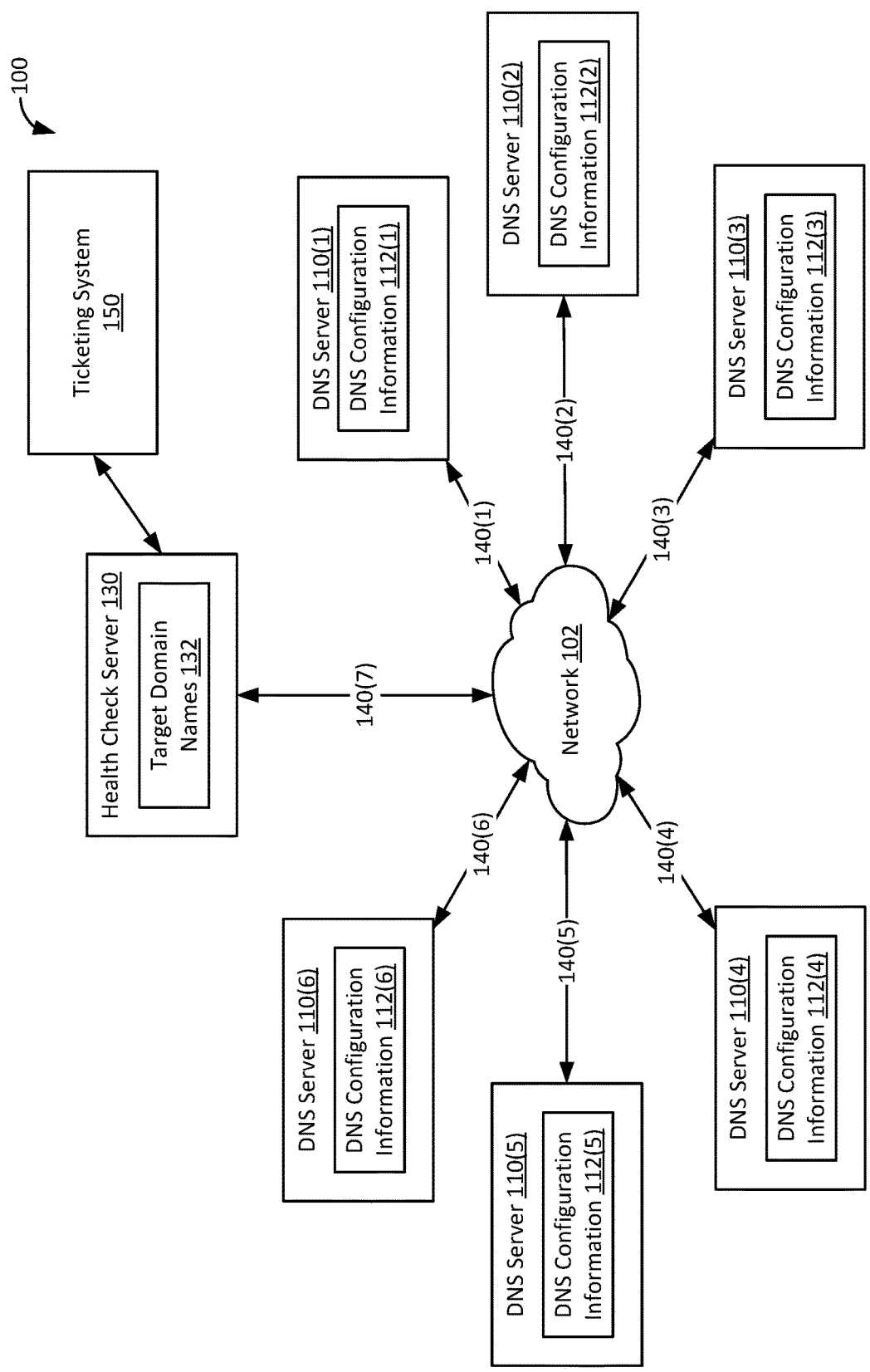
FIG. 1 is a block diagram illustrating an example DNS ecosystem, according to various embodiments.

FIG. 1 is a block diagram illustrating an example DNS ecosystem 100, according to various embodiments. As shown in FIG. 1, DNS ecosystem 100 includes, without limitation, DNS servers 110(1)-110(6), a health check server 130 connected to a network 102 using communication links 140(1)-(7), and a ticketing system 150. Although six DNS servers 110 are shown in FIG. 1, in various embodiments, DNS ecosystem 100 can include any number and/or type of DNS servers and/or include elements not illustrated in FIG. 1. In some embodiments, DNS ecosystem 100 is a DNS ecosystem managed by a given entity (e.g., a company). The DNS ecosystem 100 communicates with other DNS servers outside of the DNS ecosystem 100 to obtain DNS information managed by the other DNS servers.

Network 102 includes any technically feasible type of communications network that allows data to be exchanged between elements of the DNS ecosystem 100, such as one or more of the DNS servers 110, health check server 130, client devices (not shown), and/or the like. For example, network 102 could include one or more of a wide area network (WAN), a local area network (LAN), a wireless (WiFi) network, the Internet, and/or the like.

Each element included in DNS ecosystem 100 (e.g., DNS servers 110 and health check server 130) could have access to or is able to communicate with a different set of elements included in DNS ecosystem 100 (i.e., other DNS servers 110) and/or to a different number of elements included in DNS ecosystem 100 via the network 102. For example, network 102 could include a firewall that allows only DNS servers 110(1) and 110(2) to communicate with DNS server 110(3) and prevent other elements of DNS ecosystem 100, such as DNS servers 110(4)-(6), from communicating with DNS server 110(3). The elements included in DNS ecosystem 100 that a given element has access to could depend on any number and/or types of factors, such as the given element, the configuration of the given element, the other element(s) of DNS ecosystem 100, the configuration of the other element(s) of DNS ecosystem 100, the configuration of elements included in network 102 (e.g., firewalls, routers, switches, and/or the like), the location of the given element and the other element within a network 102 (e.g., whether the given element is connected to a portion of network 102 that is internal or external to a portion of network 102 to which the other element is connected), and/or the like.

Each DNS server 110 includes corresponding DNS configuration information 112. A DNS configuration information 112 could include, for example, information indicating a network address corresponding to a given domain name or information indicating another server that includes information associated with the given domain name, such as name server delegations, zone transfers, DNS forwarders, and/or the like. In some embodiments, when a DNS server 110 receives a request associated with a domain name, the DNS server 110 transmits a network address corresponding to the domain name or one or more network addresses corresponding to other DNS servers 110 that include information associated with the domain name. In some embodiments, instead of transmitting a network address corresponding to another DNS server 110 to the requesting device, the DNS server 110 transmits or forwards the request to the other DNS server 110. As an example, DNS configuration information 112(1) for DNS server 110(1) could include DNS forwarding information that indicates that DNS server 110(2) is a forwarding server for a given domain name. In response to receiving a request associated with the given domain name, DNS server 110(1) could forward the request to DNS server 110(2).

The DNS configuration information 112 included in a given DNS server 110 can be different from the DNS configuration information 112 included in other DNS servers 110. For example, DNS configuration 112(1) could include information associated with a domain name that is not included in one or more of DNS configuration information 112(2)-(6), could include different information for a given domain name than the information for the given domain name in one or more of DNS configuration information 112(2)-(6), could lack information that is included in one or more of DNS configuration information 112(2)-(6), and/or the like.

When a client application on a client device makes a request that includes a domain name, a DNS resolver at the client device is configured to transmit requests to one or more DNS servers (e.g., one or more of DNS servers 110) to attempt to find the network address corresponding to the requested domain name. If a DNS server includes information associated with the requested domain name, the DNS server transmits the information to the DNS resolver. If the information received from a DNS server includes a network address or other pointer to another DNS server, then the DNS resolver transmits a request to the other DNS server. Accordingly, the DNS resolver iteratively transmits requests based on information received from different DNS servers until the DNS resolver obtains the network address corresponding to the requested domain name or was unable to obtain the network address from any of the DNS servers to which the DNS resolver transmitted a request.

In some cases, the DNS resolver may not be able to obtain the network address corresponding to the requested domain name if there are issues within the DNS ecosystem, such as no DNS server having information associated with the domain name, a DNS server that manages information associated with the domain name being unavailable, the information provided by a DNS server being out of date, and/or the like. As an example, DNS configuration information 112(1) for DNS server 110(1) could include forwarding information that indicates that DNS servers 110(2), 110(3), and 110(4) are forwarding servers for a given domain name. When DNS server 110(1) receives a request associated with the given domain name, DNS server 110(1)

attempts to forward the request to DNS servers 110(2)-(4). However, if one of DNS servers 110(2)-(4) is unavailable (e.g., disconnected from network 102, does not allow requests from DNS server 110(1), is unable to receive requests from DNS server 110(1), and/or the like) or cannot provide the requested information (e.g., does not include information associated with the given domain name, is unable to respond to the forwarded request, does not provide responses to requests from DNS server 110(1), and/or the like, then the forwarded request would not be successful. If at least one of DNS servers 110(2)-(4) is available and successfully provides the requested information, the DNS server 110(1) can successfully respond to the request. However, if none of the DNS servers 110(2)-(4) are available, then DNS server 110(1) will not be able to respond to the request. Such issues can cause devices, websites, web services, and/or the like that are associated with the requested domain name to be unavailable or inaccessible to the client application.

To address the above problems, DNS ecosystem 100 includes, without limitation, a health check server 130 that detects issues within DNS ecosystem 100. As described in further detail below, health check server 130 performs one or more validation operations based on a plurality of target domain names 132 to identify issues associated with resolving the plurality of target domain names 132 using the DNS servers 110. In some embodiments, if health check server 130 identifies an issue associated with resolving the plurality of target domain names 132, health check server 130 causes one or more actions to be performed based on the identified issue. In some embodiments, health check server 130 also validates the DNS configuration information 112, or a portion thereof, included at each DNS server 110. In some embodiments, if health check server 130 identifies an issue associated with the DNS configuration information 112 included at a DNS server 110, health check server 130 causes one or more actions to be performed based on the identified issue. Such an action is generating a ticket in the ticketing system 150 that is used to track and investigate any issue identified by the health check server. The ticketing system 150 can be any technically feasible issue tracking system that enables the creation, investigation, analysis, modification, and deletion of tickets tracking individual issues.

Figure 2:
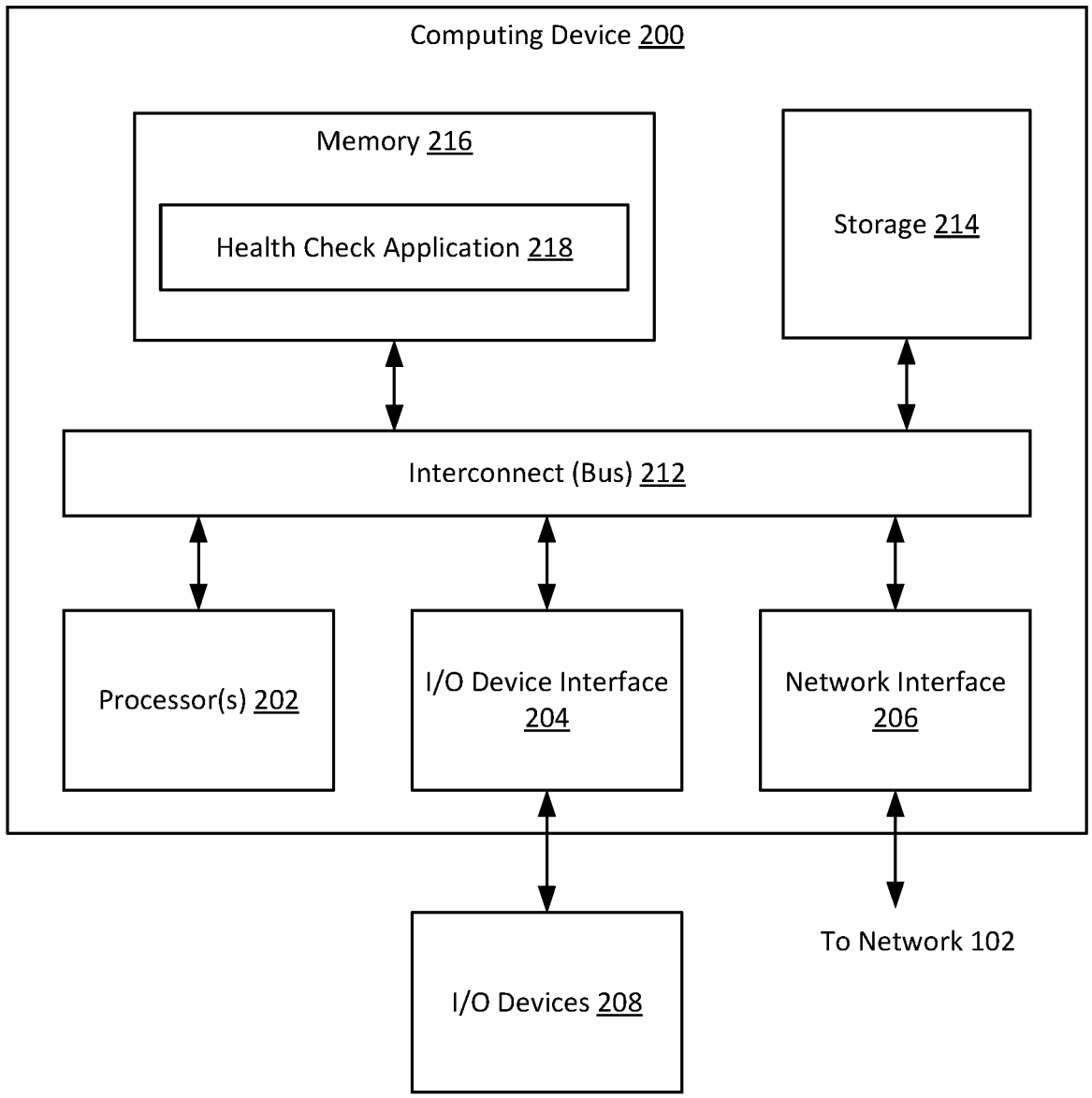
FIG. 2 is a block diagram illustrating a computing device configured to implement the health check server of FIG. 1, according to various embodiments.

FIG. 2 is a block diagram illustrating a computing device 200 configured to implement the health check server 130 of FIG. 1, according to various embodiments. As shown, computing device 200 includes an interconnect (bus) 212 that connects one or more processing unit(s) 202, an input/output (I/O) device interface 204 coupled to one or more input/output (I/O) devices 208, memory 216, a storage 214, and a network interface 206 connected to the network 102.

Computing device 200 includes a server computer, a desktop computer, a laptop computer, a smart phone, a personal digital assistant (PDA), tablet computer, or any other type of computing device configured to receive input, process data, and optionally display images, and is suitable for practicing one or more embodiments. Computing device 200 described herein is illustrative, and any other technically feasible configurations fall within the scope of the present disclosure.

The one or more processing unit(s) 202 includes any suitable processor implemented as a central processing unit (CPU), a graphics processing unit (GPU), an application-specific integrated circuit (ASIC), a field programmable gate array (FPGA), an artificial intelligence (AI) accelerator such as a tensor processing unit (TPU), any other type of processing unit, or a combination of different processing units, such as a CPU configured to operate in conjunction with a GPU. In general, processing unit(s) 202 can be any technically feasible hardware unit capable of processing data and/or executing software applications. Further, in the context of this disclosure, the computing elements shown in computing device 200 can correspond to a physical computing system (e.g., a system in a data center) or can be a virtual computing embodiment executing within a computing cloud.

In one embodiment, I/O devices 208 include devices capable of providing input, such as a keyboard, a mouse, a touch-sensitive screen, and so forth, as well as devices capable of providing output, such as a display device. Additionally, I/O devices 208 can include devices capable of both receiving input and providing output, such as a touchscreen, a universal serial bus (USB) port, and so forth. I/O devices 208 can be configured to receive various types of input from an end-user (e.g., a designer) of computing device 200, and to also provide various types of output to the end-user of computing device 200, such as displayed digital images or digital videos or text. In some embodiments, one or more of I/O devices 208 are configured to couple computing device 200 to the network 102.

Storage 214 includes non-volatile storage for applications and data, and may include fixed or removable disk drives, flash memory devices, and CD-ROM, DVD-ROM, Blu-Ray, HD-DVD, or other magnetic, optical, or solid-state storage devices. Health check application 218 can be stored in storage 214 and loaded into memory 216 when executed.

Memory 216 includes a random-access memory (RAM) module, a flash memory unit, or any other type of memory unit or combination thereof. Processing unit(s) 202, I/O device interface 204, and network interface 206 are configured to read data from and write data to memory 216. Memory 216 includes various software programs that can be executed by processing unit(s) 202 and application data associated with said software programs, including health check application 218. In some embodiments, health check application 218 causes computing device 200 to communicate with one or more DNS servers 110 to, among other things, obtain corresponding DNS configuration information 112 from the one or more DNS servers 110, validate the DNS configuration information 112, detect issues associated with the one or more DNS servers 110, and/or the like. Health check application 218 is described in further detail below with respect to FIG. 3.

It will be appreciated that the system shown herein is illustrative and that variations and modifications are possible. Although FIG. 2 illustrates health check application 218 executing on a single computing device 200, multiple instances of health check application 218 can execute on any number of computing devices. For example, a first instance of health check application 218 could be configured to perform validation operations based on a first set of domain names and/or for a first set of DNS servers 110, and a second instance of health check application 218 could be configured to perform validation operations based on a second set of domain names and/or for a second set of DNS servers 110. In such embodiments, a given instance of health check application 218 could be configured to transmit the results of the validation operations to one or more other instances of health check application 218. A health check application 218 could receive results from another health check application 218 and generate a compiled set of results. Further, the functionality included in health check application 218 can be divided across any number of applications or other software that are stored and execute via any number of devices that are located in any number of physical locations. For example, a first application could be configured to generate a list of DNS elements to test based on a set of target domain names 132 and a second application could be configured to perform validation operations based on the list of DNS elements. Each of the first application and second application could execute on a different computing device.

Figure 3:
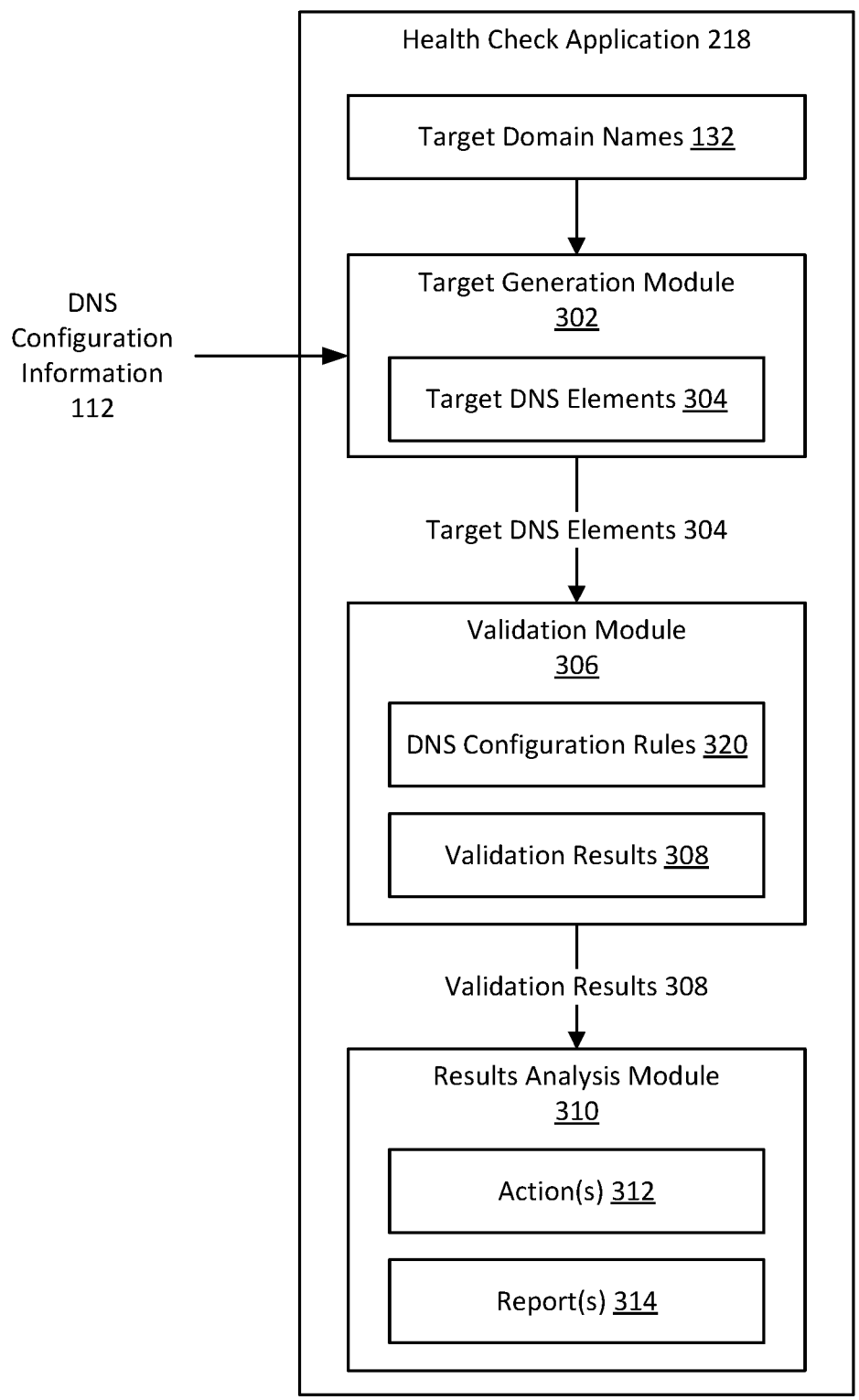
FIG. 3 is a more detailed illustration of the health check application of FIG. 2, according to various embodiments.

FIG. 3 is a more detailed illustration of the health check application 218 of FIG. 2, according to various embodiments. As shown in FIG. 3, health check application 218 includes, without limitation, a target generation module 302, a validation module 306, and a results analysis module 310. Health check application 218 is configured to receive a set of target domain names 132 and perform validation operations on a plurality of DNS servers (e.g., DNS servers 110(1)-(6)) based on the set of target domain names 132 to generate a set of validation results 308. Health check application 218 identifies issues associated with the plurality of DNS servers based on the set of validation results 308. If health check application 218 identifies any issues, health check application 218 performs one or more actions 312 based on the identified issues and/or generates one or more reports 314 indicating the identified issues.

In operation, a target generation module 302 receives a set of target domain names 132. The target domain names 132 include a plurality of domain names to be used in verifying the availability of DNS servers 110 within a DNS ecosystem 100 and the accuracy of the DNS configuration information 112 managed by the DNS servers 110.

In some embodiments, the set of target domain names 132 includes one or more internal domain names and one or more external domain names. An internal domain name is a domain name associated with device(s) or service(s) that are internal to a given portion of a network and is resolved by DNS servers that are also internal to the given portion of the network. An external domain name is a domain name associated with device(s) or service(s) that are external to the given portion of the network and can be resolved by DNS servers that are external to the given portion of the network. For example, an internal domain name could be a domain name associated with a computing device that belongs to the same network 102 as DNS servers 110. One or more of DNS servers 110(1)-(6) could manage network address information associated with the internal domain name. Additionally, the network address associated with the internal domain name could be a private network address that is local to network 102 and/or the DNS servers 110 are configured to only provide the network address information in response to requests from computing devices that are also within network 102 (i.e., is not a publicly accessible domain name). In contrast, an external domain name could be associated with a computing device that does not belong to network 102 and is associated with a public network address (i.e., is a publicly accessible domain name). Network address information associated with the external domain name could be managed by a DNS server that is not included in DNS ecosystem 100.

Target generation module 302 determines a set of one or more target DNS servers. In some embodiments, target generation module 302 receives data specifying the set of target DNS servers. For example, target generation module 302 could receive user input specifying the set of target DNS servers, receive or load a data file specifying the set of target DNS servers, and/or the like. In some embodiments, target generation module 302 determines the set of target DNS servers by identifying one or more internal DNS servers. For example, assume health check server 130 is connected to a first portion of network 102 and DNS servers 110(1)-(3) are connected to the first portion of network 102, while DNS servers 110(4)-(6) are connected to a second portion of network 102 that is external to the first portion of network 102. Target generation module 302 could perform one or more scan operations to identify DNS servers 110(1)-(3) within the first portion of network 102. After determining the set of target DNS servers, target generation module 302 requests and/or receives DNS configuration information 112 from each target DNS server in the set of target DNS servers. For example, target generation module 302 could receive a "named.conf" configuration file or other configuration data from each target DNS server.

Target generation module 302 generates a set of target DNS elements 304 based on the DNS configuration information 112 received from the target DNS servers and the set of target domain names 132. In some embodiments, target generation module 302 parses the DNS configuration information 112 to identify information associated with the set of target domain names 132. Target generation module 302 identifies one or more DNS elements specified by the identified information. The one or more DNS elements are included in the set of target DNS elements 304. In some embodiments, for each target DNS server, target generation module 302 identifies one or more of: one or more zone transfer sources specified by the corresponding DNS configuration information 112; one or more forwarding destinations specified by the corresponding DNS configuration information 112; one or more nameserver (NS) delegation destinations specified by the corresponding DNS configuration information 112; one or more authoritative servers specified by the corresponding DNS configuration information 112; and/or the like.

In some embodiments, target generation module 302 generates information associated with each target DNS element 304, such as information used by validation module 306 to validate the target DNS element 304. The information could include, for example and without limitation, an identifier associated with the target DNS element 304, an element type of the target DNS element 304, and/or other attributes associated with the target DNS element 304. An identifier of a target DNS element 304 identifies the target DNS element 304 and/or a location within a network 102 of the target DNS element 304. The identifier is used to transmit a query to, or otherwise communicate with, the target DNS element 304. An identifier could be, for example, a network address corresponding to the target DNS element 304. The element type of the target DNS element 304 indicates the type of DNS configuration information that the target DNS element 304 is associated with. For example, the DNS configuration information could specify that a given DNS element is an authoritative server, a zone transfer source, a forwarding destination, a delegation destination, and/or the like. Target generation module 302 parses the corresponding DNS configuration information to determine the element type of the target DNS element 304.

Target generation module 302 transmits the target DNS elements 304 to validation module 306. In some embodiments, transmitting the target DNS elements 304 includes transmitting the identifier corresponding to each target DNS element 304. Additionally, in some embodiments, target generation module 302 transmits other information associated with each target DNS element 304, such as the element type of each target DNS element 304. Validation module 306 receives the set of target DNS elements 304 and performs one or more validation operations on each target DNS element 304 based on the set of target domain names 132 to generate a set of validation results 308. The set of validation results 308 indicate, for each target DNS element 304, the result of performing the one or more validation operations on the target DNS element 304. The set of validation results 308 could indicate, for example and without limitation, whether the health check server 130 successfully connected to each target DNS server, whether any connectivity issues occurred between health check server 130 and each target DNS server, whether each target DNS server successfully connected to each target DNS element 304, whether any connectivity issues occurred between each target DNS server and each target DNS element 304, the result of performing queries for each target domain name 132 on each target DNS element 304, the types of domain names that each target DNS element 304 was able to resolve (e.g., internal, external, or both), and/or the like.

In some embodiments, validation module 306 receives, retrieves, or otherwise determines the set of target DNS servers. For example, target generation module 302 could include the set of target DNS servers when transmitting the target DNS elements 304. Validation module 306 performs one or more operations to check the connectivity between the health check server 130 and each target DNS server and/or to check the availability of each target DNS server. Validation module 306 includes the results of the one or more operations in validation results 308. For example, validation module 306 could transmit one or more requests to each target DNS server. Validation module 306 includes the results of transmitting the one or more requests in validation results 308 (e.g., requests were successfully transmitted, requests timed out, and/or the like).

In some embodiments, the one or more validation operations include operations to check whether the health check application 218 can successfully connect to each target DNS element 304. The set of validation results 308 indicates, for each target DNS element 304, whether the health check application 218 successfully connected to the target DNS element 304. For example, validation module 306 could transmit one or more requests to each target DNS element 304. Validation module 306 includes the results of transmitting the one or more requests in validation results 308.

In some embodiments, the one or more validation operations include operations to check whether each target DNS server can successfully connect to each target DNS element 304 included in the set of target DNS elements 304, or a subset thereof. For example, validation module 306 could determine whether each target DNS server can successfully connect to a subset of target DNS elements 304 associated with the target DNS server (e.g., the subset of target DNS elements 304 specified in the DNS configuration information 112 of the target DNS server). If a given target DNS element 304 is not associated with a target DNS server, then validation module 306 does not check the connection between the target DNS server and the given target DNS element 304. The set of validation results 308 indicates, for each target DNS server, whether the target DNS server successfully connected to each target DNS element included in the set of target DNS elements 304 or subset of target DNS elements 304, whichever the case may be.

In some embodiments, validation module 306 performs one or more DNS queries based on the set of target DNS elements 304 and the set of target domain names 132. In some embodiments, validation module 306 transmits a DNS query for each target domain name 132 to each target DNS element 304 included in the set of target DNS elements 304, or a subset of target DNS elements 304. For example, validation module 306 could transmit a DNS query to each target DNS element 304 that corresponds to a forwarding destination. Validation module 306 includes the results of performing the one or more queries in the set of validation results 308. A query result could be, for example, that the target DNS element 304 was available but the requested DNS record was not available (e.g., "NXDOMAIN"); the target DNS element 304 was running DNS but would not provide an answer for the requested DNS record (e.g., "REFUSED"); the target DNS element 304 was available and the requested DNS record was provided (e.g., "NO ERROR"); or the target DNS element 304 did not provide a response (e.g., "SERVFAIL").

In some embodiments, validation module 306 performs the one or more DNS queries via each target DNS server included in the set of target DNS servers. For example, validation module 306 could log in to each target DNS server and perform the one or more DNS queries while logged in to the target DNS server. Validation module 306 determines, for each target DNS server, the results of performing the one or more DNS queries using the target DNS server. As another example, validation module 306 could transmit a request or instructions to each target DNS server to cause the target DNS servers to perform the one or more DNS queries. Validation module 306 receives, from each target DNS server, the results of performing the one or more DNS queries.

As an example, for a DNS server 110, the DNS configuration information 112 could include one or more zone transfer destinations, one or more forwarding destinations, and one or more delegation destinations. Each of the one or more zone transfer destinations, one or more forwarding destinations, and one or more delegation destinations are included in the subset of target DNS elements 304 associated with the DNS server 110. Validation module 306 uses the DNS server 110 to transmit a query for each target domain name 132 to each zone transfer destination, each forwarding destination, and each delegation destination. Validation module 306 includes the responses to each query in the set of validation results 308.

Additionally, in some embodiments, validation module 306 includes, for each query response, information associated with the corresponding query. Referring to the above example, validation results 308 indicate, for each query response, the target domain name 132, the DNS server 110, and the target DNS element 304 (e.g., zone transfer destination, forwarding destination, or delegation destination) associated with the corresponding query.

In some embodiments, the set of target domain names 132 includes one or more internal domain names and one or more external domain names. Performing DNS queries for each target DNS element 304 includes performing one or more internal queries based on the one or more internal domain names and one or more external queries based on the one or more external domain names. The validation results 308 could further indicate, for each query response, whether the query was an internal query or an external query. In some embodiments, validation module 306 determines, for each target DNS element 304, whether the target DNS element 304 was able to resolve only internal domain names, only external domain names, or both internal and external domain names. Validation module 306 includes, in the set of validation results 308, information indicating whether each target DNS element 304 was able to resolve only internal domain names, only external domain names, or both internal and external domain names.

In some embodiments, after performing one or more validation operations, validation module 306 retrieves network connection information associated with the one or more validation operations. Validation module 306 includes the network connection information in validation results 308. For example, validation module 306 could communicate with one or more network elements included in network 102 to request network logs, such as firewall logs, router logs, and/or the like. Validation module 306 parses the logs to identify network log entries associated with the one or more validation operations (e.g., connectivity testing operations for the target DNS servers and/or target DNS elements 304). Validation module 306 includes the identified entries in the set of validation results 308.

As shown in FIG. 3, in some embodiments, validation module 306 includes one or more DNS configuration rules 320. A DNS configuration rules 320 specifies a rule associated with DNS configuration information 112, such as information that should be included in a given set of DNS configuration information 112, information that should not be included in a given set of DNS configuration information 112, and/or the like. In such embodiments, validation module 306 performs one or more validation operations on the DNS configuration information 112 associated with the set of target DNS servers based on the one or more DNS configuration rules 320. Validation module 306 determines, based on the DNS configuration rules 320, whether each set of DNS configuration information 112 violates one or more of the DNS configuration rules 320. Validation module 306 includes, for each target DNS server, information indicating whether the corresponding DNS configuration information 112 satisfies the one or more DNS configuration rules 320.

As an example, the DNS configuration rules 320 could include a rule that specifies that DNS records for public domains (i.e., domains hosted on an externally facing server) should not include private network addresses or other types of addressing reserved for private use, such as private IPV6, private multicast, and/or the like. Validation module 306 could determine a subset of target domain names 132 that are hosted on externally facing servers. Validation module 306 parses the DNS configuration information 112 to identify network addresses corresponding to the subset of target domain names 132. Validation module 306 determines whether any of the identified network addresses correspond to private network addresses or other private use addresses. Validation module 306 includes in validation results 308 information indicating the domain names and/or DNS records that correspond to private network addresses or other private use addresses, if any.

In some embodiments, a DNS configuration rule 320 includes matching information for determining whether a given set of DNS configuration information 112 satisfies or violates the DNS configuration rule 320. Referring to the above example, the DNS configuration rule 320 could specify a pattern associated with private addressing (e.g., 10.X.X.X.; 172.16.X.X; 192.168.X.X; other RFC1918 type private addressing blocks; and/or the like). Validation module 306 compares each network address with the specified pattern. If a network address matches the specified pattern, then validation module 306 determines that the network address violates the DNS configuration rule 320.

After generating the set of validation results 308, validation module 306 transmits the set of validation results 308 to results analysis module 310. Results analysis module 310 receives the set of validation results 308 and analyzes the set of validation results 308 to identify issues associated with the set of target domain names 132, set of target DNS servers, DNS configuration information 112, and/or other DNS servers in a DNS ecosystem 100. In some embodiments, results analysis module 310 generates one or more actions 312 and/or one or more reports 314 based on the analysis. An action 312 can be any suitable action for responding to an identified issue, such as generating an alert, generating a notification, generating a support ticket, rebooting a DNS server 110, updating DNS configuration information 112, and/or the like. In some embodiments, if an action 312 is an alert, notification, support ticket, and/or the like, then results analysis module 310 includes information associated with the identified issue, such as a DNS server associated with the issue, a domain name associated with the issue, the type of issue, the subset of validation results 308 corresponding to the issue, and/or the like.

In some embodiments, a report 314 include the results of the analysis performed by results analysis module 310, such as any identified issues associated with the set of target domain names 132, set of target DNS servers, DNS configuration information 112, and/or other DNS servers in a DNS ecosystem 100. In some embodiments, the report 314 includes, for each issue, information associated with the issue, such as a DNS server associated with the issue, a domain name associated with the issue, the type of issue, the subset of validation results 308 corresponding to the issue, and/or the like. Additionally, in some embodiments, if no issues were identified for a given target domain name 132, DNS server 110, or set of DNS configuration information 112, the report 314 indicates that no issues were found for the given target domain name 132, DNS server 110, or set of DNS configuration information 112. In some embodiments, the report 314 includes additional information associated with the validation results 308, such as a list of forwarding servers, the types of requests each forwarding server is configured to respond to (e.g., internal, external, or both), a list of DNS servers that are associated with incorrect configurations, a list of externally accessible domain names that are associated with private addresses, the query results for each source-destination pair, and/or the like.

In some embodiments, results analysis module 310 determines, for each DNS server 110 included in a set of target DNS servers, a subset of validation results 308 associated with the DNS server 110. Results analysis module 310 analyzes the subset of validation results 308 to identify issues associated with the DNS server 110. In some embodiments, results analysis module 310 generates a corresponding report 314 for each DNS server 110 based on analyzing the subset of validation results 308 associated with the DNS server 110.

In some embodiments, results analysis module 310 determines, for each domain name included in a set of target domain names 132, a subset of validation results 308 associated with the domain name. Results analysis module 310 analyzes the subset of validation results 308 to identify issues associated with the domain name. In some embodiments, results analysis module 310 generates a corresponding report 314 for each domain name based on analyzing the subset of validation results 308 associated with the domain name.

In some embodiments, results analysis module 310 determines, for each DNS server 110 and for each domain name, a subset of validation results 308 associated with the DNS server 110 and the domain name. Results analysis module 310 analyzes the subset of validation results 308 to identify issues associated with the domain name with respect to the DNS server 110. In some embodiments, results analysis module 310 generates a corresponding report 314 for each domain name and/or DNS server 110 based on analyzing the subset of validation results 308 associated with each pair of domain name and DNS server 110.

In some embodiments, results analysis module 310 analyzes validation results 308 to determine, for each forwarding server included in the set of target DNS elements 304, a first number of DNS servers included in the plurality of target DNS servers where one or more DNS queries to the forwarding server from a DNS server failed (e.g., could not connect or did not return a result) and/or a second number of DNS servers where one or more DNS queries to the forwarding server from a DNS server succeeded. If the first number of DNS servers failed is zero, then results analysis module 310 determines that there are no issues associated with connecting to the forwarding server from the plurality of target DNS servers.

If the first number of failed forwarding servers is zero but the second number of DNS servers is one (i.e., only a single DNS server connects to the forwarding server), then results analysis module 310 determines that there is an issue associated with a lack of redundancy. In some embodiments, in response to determining that there is an issue associated with a lack of redundancy, results analysis module 310 generates an action 312 to address the lack of redundancy, such as generating and transmitting a notification to a network administrator or generating and submitting a support ticket to a support ticket system associated with one or more of the target DNS servers.

If the first number of failed forwarding servers is not zero, then results analysis module 310 determines that there is an issue associated with communicating with the forwarding server. In some embodiments, if the first number is greater than zero and the second number is also greater than zero (i.e., some DNS servers succeeded), then results analysis module 310 determines that there is an issue associated with degraded resiliency. In some embodiments, in response to determining that there is an issue associated with degraded resiliency, results analysis module 310 generates an action 312 to address the degraded resiliency, such as generating and transmitting a notification to a network administrator or generating and submitting a support ticket to a support ticket system associated with one or more of the target DNS servers (e.g., the target DNS servers corresponding to failed queries).

In some embodiments, results analysis module 310 determines that queries from all but one DNS server failed for a forwarding server (i.e., only a single DNS server successfully connects to the forwarding server), then results analysis module 310 determines that there is an issue associated with a lack of high availability. In some embodiments, in response to determining that there is an issue associated with a lack of high availability, results analysis module 310 generates an action 312 to address the lack of high availability, such as generating and transmitting a notification to a network administrator or generating and submitting a support ticket to a support ticket system associated with one or more of the target DNS servers (e.g., the target DNS servers corresponding to failed queries).

In some embodiments, results analysis module 310 determines that queries from all DNS servers included in the set of target DNS servers failed for a forwarding server, then results analysis module 310 determines that there is an issue associated with incorrect or outdated information. For example, a forwarding server could be unavailable to all DNS servers if the forwarding server is no longer included in the DNS ecosystem 100, if the location of the forwarding server is different from the location indicated by the DNS configuration information on each DNS server, if the location of the forwarding server is no longer accessible by the DNS servers, and/or the like. In some embodiments, in response to determining that there is an issue associated with incorrect or outdated information, results analysis module 310 generates an action 312 to address the incorrect or outdated information, such as generating and transmitting a notification to a network administrator or generating and submitting a support ticket to a support ticket system associated with the DNS server 110.

In some embodiments, results analysis module 310 analyzes validation results 308 to determine whether there are any connectivity issues associated with a given source and destination pair (e.g., between the health check server 130 and a target DNS server 110, between a target DNS server 110 and a forwarding destination, between a target DNS server 110 and a zone transfer source, and/or the like). For example, results analysis module 310 could determine whether the validation results 308 include results indicating that a given source was unable to reach a given destination, whether a request from a given source to a given destination timed out, whether network logs (such as firewall logs, forwarding logs, or router logs) for dropped traffic correspond to a given source and destination pair, and/or the like. In some embodiments, in response to determining that there is an issue associated with connectivity between a source and destination pair, results analysis module 310 generates an action 312 to address the connectivity issue, such as generating and transmitting a notification to a network administrator or generating and submitting a support ticket to a support ticket system associated with at least one of the source or destination.

In some embodiments, results analysis module 310 analyzes validation results 308 to determine whether any DNS configuration information 112 violated a DNS configuration rule 320. If results analysis module 310 determines that a DNS configuration rule 320 was violated, results analysis module 310 determines a domain name and/or DNS server 110 that violated the DNS configuration rule. In some embodiments, results analysis module 310 generates an action 312 to address the rule violation, such as generating and transmitting a notification to a network administrator or generating and submitting a support ticket to a support ticket system associated with at least one of the source or destination.

In some embodiments, results analysis module 310 analyzes validation results 308 to determine whether each DNS element 304 provided a correct response to a DNS query. Results analysis module 310 could determine, for example and without limitation, whether a server that should have provided a response successfully provided a response, whether a server that should not have provided a response did not provide a response, whether the network address provided by a server matches an expected network address, and/or the like.

One benefit of the above techniques is that issues associated with a DNS ecosystem are identified more efficiently and accurately compared to prior approaches. In particular, by generating the set of target DNS elements that are associated with a set of target domain names, the portion of the DNS ecosystem associated with the set of target domain names can be quickly identified and validated to determine whether there are any issues within the DNS ecosystem that are associated with the set of target domain names. Furthermore, because individual elements are being validated, health check application 218 is able to identify specific elements that are associated with an issue or a potential issue. Accordingly, using the disclosed techniques, health check application 218 is able to pre-emptively identify issues within a DNS ecosystem 100, even when results are being successfully returned for a target domain name.

Another benefit is that health check application 218 can identify issues associated with the DNS configuration information 112 included in a DNS server 110. In some cases, a DNS server 110 could be configured improperly or otherwise configured in a manner that is not intended by a network manager. However, the DNS server 110 responds successfully to DNS requests. Because the DNS server 110 successfully responds to DNS requests, the improper or unintended configuration information is not easily identified or addressed. As an example, internal or private addressing could be exposed via DNS services, which could result in further issues such as security vulnerabilities, the incorrect network address being supplied to an external request, and/or the like if left unaddressed. Using the above techniques, health check application 218 is able to detect when an internal or private address is associated with a public domain and generate action(s) 312 to address the issue.

Figure 4:
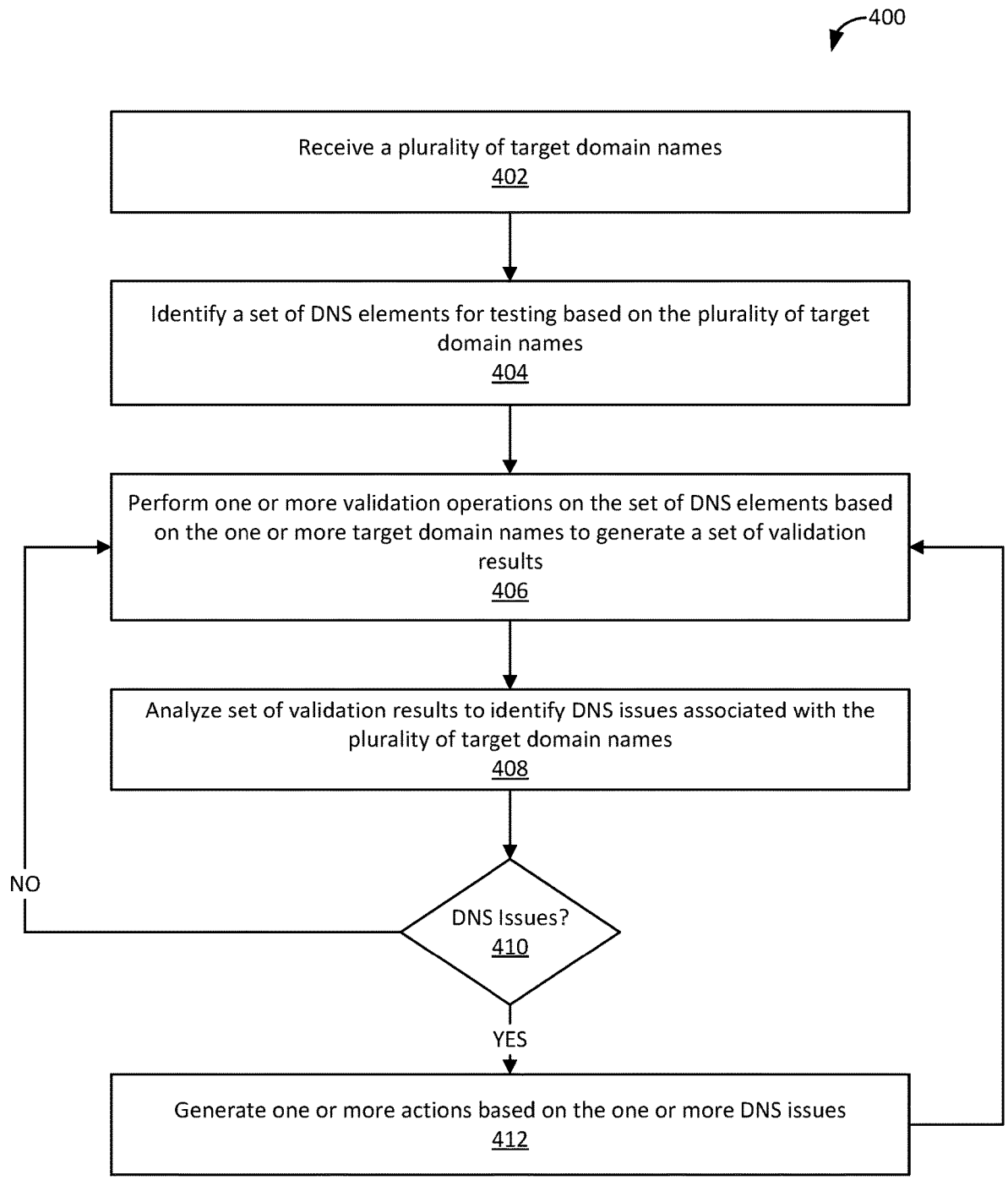
FIG. 4 is a flowchart of method steps for detecting issues within a DNS ecosystem based on a set of target domain names, according to various embodiments.

FIG. 4 is a flowchart of method steps for detecting issues within a DNS ecosystem 100 based on a set of target domain names 132, according to various embodiments. Although the method steps are described in conjunction with the systems of FIGS. 1-3, persons skilled in the art will understand that any system configured to perform the method steps in any order falls within the scope of the present disclosure.

As shown in FIG. 4, a method 400 begins at a step 402, where a health check application 218 receives a plurality of target domain names 132. The plurality of target domain names 132 specify domain names to be used in verifying the availability of DNS servers 110 within a DNS ecosystem 100, the availability of DNS servers outside of DNS ecosystem 100 that are referenced by the DNS servers 110, and/or the accuracy of the DNS configuration information 112 managed by the DNS servers 110. In some embodiments, the set of target domain names 132 includes one or more internal domain names and one or more external domain names.

At step 404, the health check application 218 identifies a set of DNS elements 304 for testing based on the plurality of target domain names 132. The set of DNS elements 304 includes one or more DNS servers that are associated with the plurality of target domain names. For example, the set of DNS elements 304 could include one or more zone transfer sources, one or more forwarding servers, one or more delegation destinations, and/or the like that are specified for the plurality of target domain names. Identifying the set of DNS elements 304 is performed in a manner similar to that discussed above with respect to target generation module 302.

In some embodiments, health check application 218 receives DNS configuration information 112 from a plurality of target DNS servers. Health check application 218 analyzes the DNS configuration information 112 to identify DNS records included in the DNS configuration information 112 that correspond to the plurality of target domain names. Health check application 218 determines, for each identified DNS record, a DNS element specified by the DNS record.

In some embodiments, health check application 218 generates information associated with each target DNS element 304, such as information used by validation module 306 to validate the target DNS element 304. The information could include, for example and without limitation, a network address or other identifier associated with the target DNS element 304, an element type of the target DNS element 304, and/or other attributes associated with the target DNS element 304.

At step 406, the health check application 218 performs one or more validation operations on the set of target DNS elements 304 based on the plurality of target domain names 132 to generate a set of validation results 308. The set of validation results 308 indicate the results of performing the one or more validation operations. Generating the set of validation results 308 is performed in a manner similar to that discussed above with respect to validation module 306.

In some embodiments, the one or more validation operations include operations to check whether the health check application 218 can successfully connect to each target DNS element 304. In some embodiments, the one or more validation operations include operations to check whether each target DNS server can successfully connect to each target DNS element 304 included in the set of target DNS elements 304, or a subset thereof. In some embodiments, the one or more validation operations include generating and transmitting a DNS query for each target domain name 132 to each target DNS element 304 included in the set of target DNS elements 304, or a subset of target DNS elements 304.

In some embodiments, the one or more validation operations include operations to determine whether a target DNS element 304 is able to resolve only internal domain names, only external domain names, or both internal and external domain names.

In some embodiments, generating the set of validation results 308 further includes performing one or more validation operations on a set of target DNS servers based on the plurality of target domain names 132. In some embodiments, the one or more validation operations include operations to check the connectivity between the health check server 130 on which the health check application 218 is executing and each target DNS server. In some embodiments, the one or more validation operations include operations to check the availability of each target DNS server. In some embodiments, the one or more validation operations include operations to determine whether the DNS configuration information received from one or more target DNS servers satisfy one or more DNS configuration rules 320.

At step 408, the health check application 218 analyzes the set of validation results 308 to identify DNS issues associated with the plurality of target domain names 132. The DNS issues include any type of issue that cause a DNS query for a given target domain name 132 to be unsuccessful, such as a target DNS server being unavailable, a target DNS element being unavailable, a query for the target domain name 132 being unsuccessful, a target DNS server including inaccurate DNS records, DNS service not being available at a target DNS server or a target DNS element, dropped traffic between a target DNS server and a target DNS element when performing the one or more validation operations, and/or the like. Analyzing the set of validation results 308 is performed in a manner similar to that discussed above with respect to results analysis module 310 and further below with respect to FIGS. 5 and 6.

In some embodiments, analyzing the set of validation results 308 includes determining, for each domain name included in a set of target domain names 132, a subset of validation results 308 associated with the domain name. Health check application 218 analyzes the subset of validation results 308 associated with each domain name to identify issues associated with the domain name.

In some embodiments, analyzing the set of validation results 308 includes determining, for each DNS server 110 included in a set of target DNS servers, a subset of validation results 308 associated with the DNS server 110. Health check application 218 analyzes the subset of validation results 308 associated with each DNS server 110 to identify issues associated with the DNS server 110.

In some embodiments, analyzing the set of validation results 308 includes determining, for each DNS server 110 and for each domain name, a subset of validation results 308 associated with the DNS server 110 and domain name pair. Health check application 218 analyzes the subset of validation results 308 associated with each with the DNS server 110 and domain name pair to identify issues associated with the domain name with respect to the DNS server 110.

In some embodiments, the health check application 218 analyzes validation results 308 to determine, for a given domain name and a given DNS server 110, a first number of forwarding servers where the DNS query for the given domain name using the given DNS server 110 failed (e.g., could not connect or did not return a result) and/or a second number of forwarding servers where the DNS query for the given domain name using the given DNS server 110 succeeded. If the first number of failed forwarding servers is zero (i.e., no failures), then the health check application 218 determines that there are no issues associated with the pair of DNS server and domain name. If the first number of failed forwarding servers is not zero, then the health check application 218 determines that there is an issue associated with the DNS server 110 and domain name pair. Additionally, in some embodiments, if the first number of failed forwarding servers is zero but the second number of forwarding servers is one, then the health check application 218 also determines that there is an issue associated with the DNS server 110 and domain name pair.

In some embodiments, the health check application 218 analyzes validation results 308 to determine whether there are any connectivity issues associated with a given source and destination pair (e.g., between the health check server 130 and a target DNS server 110, between a target DNS server 110 and a forwarding destination, between a target DNS server 110 and a zone transfer source, and/or the like).

In some embodiments, the health check application 218 analyzes validation results 308 to determine whether any DNS configuration information 112 violated a DNS configuration rule 320. In some embodiments, validation results 308 includes information indicating one or more network addresses associated with one or more domains hosted on an externally facing server. Analyzing validation results 308 includes determining whether any network address included in the one or more network addresses match a pattern specified by one or more DNS configuration rules 320.

At step 410, the health check application 218 determines whether any DNS issues were identified at step 408. As shown in FIG. 4, if no DNS issues were identified, then the method returns to step 406, where health check application 218 performs one or more validation operations on the set of target DNS elements 304 based on the plurality of target domain names 132. If one or more DNS issues were identified, then the method proceeds to step 412.

At step 412, the health check application 218 generates one or more actions 312 based on one or more identified DNS issues. An action 312 can be any suitable action for responding to an identified issue, such as generating an alert, generating a notification, generating a support ticket, rebooting a DNS server 110, updating DNS configuration information 112, and/or the like.

In some embodiments, health check application 218 generates information associated with the identified issue, such as a DNS server associated with the issue, a domain name associated with the issue, the type of issue, the subset of validation results 308 corresponding to the issue, and/or the like. Health check application 218 generates the corresponding action 312 based on the generated information. For example, health check application 218 could determine a DNS server 110 to reboot based on the generated information. As another example, health check application 218 could determine a support ticket level based on the type of issue indicated by the generated information.

Additionally or alternatively, in some embodiments, health check application 218 generates one or more reports 314 based on one or more identified DNS issues. In some embodiments, the report 314 includes, for each DNS issue, information associated with the issue, such as a DNS server associated with the issue, a domain name associated with the issue, the type of issue, the subset of validation results 308 corresponding to the issue, and/or the like.

In some embodiments, the above steps 406-412 are repeated periodically (e.g., every hour, every day, every week, and/or the like). In some embodiments, the method 400 returns to step 402 or step 404 after steps 410 and 412. For example, the method 400 could return to step 402 in response to determining that the set of target domain names has been updated. As another example, the method 400 could return to step 404 in response to determining that the set of target domain names has not changed, but the set of target DNS elements has changed (e.g., DNS servers 110 added to DNS ecosystem 100, DNS servers 110 removed from DNS ecosystem 100, configuration information 112 changed for one or more DNS servers 110, and/or the like).

Figure 5:
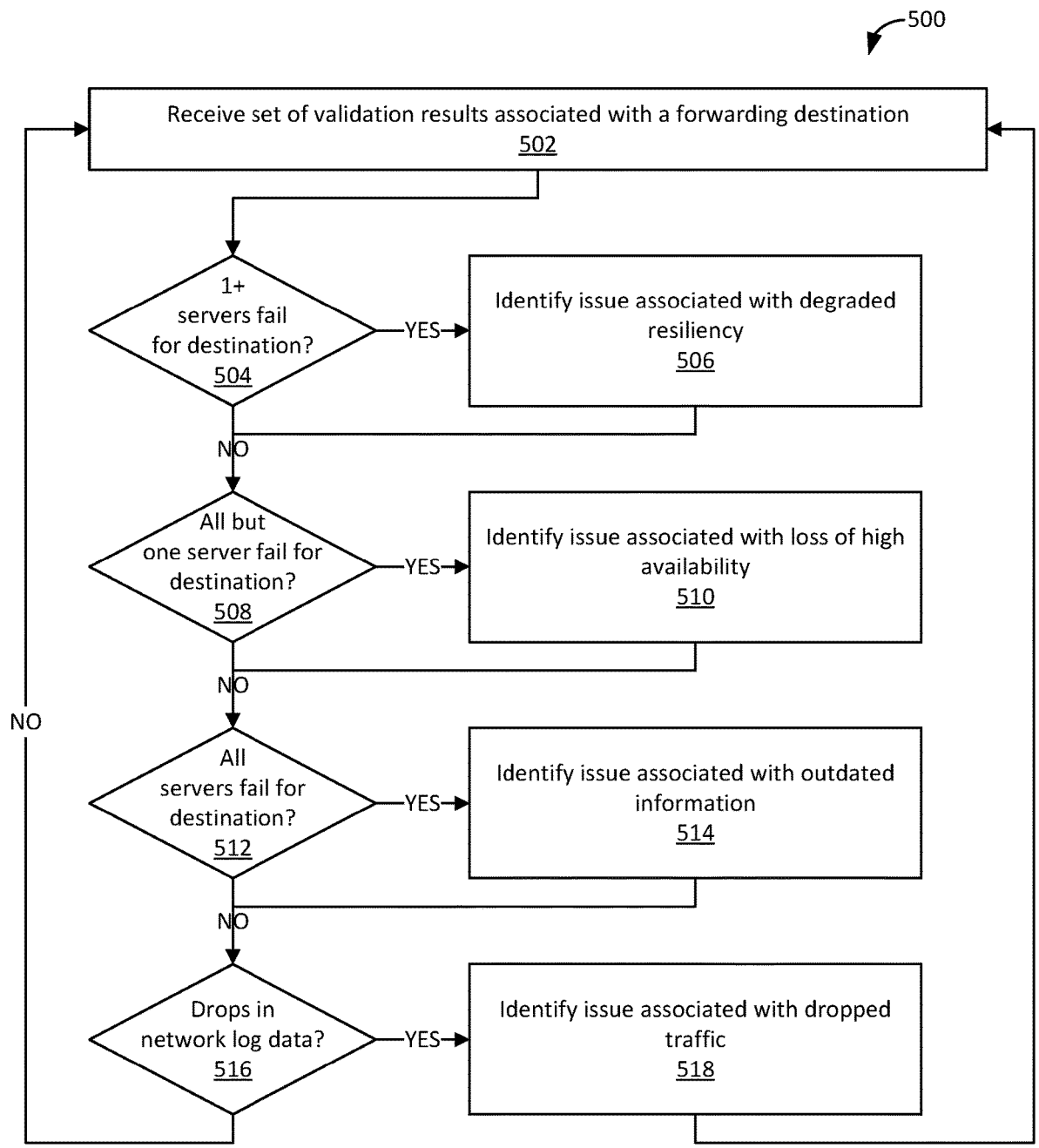
FIG. 5 is a flowchart of method steps for detecting issues associated with a forwarding server based on a set of validation results, according to various embodiments.

FIG. 5 is a flowchart of method steps for detecting issues associated with a forwarding server based on a set of validation results 308, according to various embodiments. Although the method steps are described in conjunction with the systems of FIGS. 1-3, persons skilled in the art will understand that any system configured to perform the method steps in any order falls within the scope of the present disclosure.

As shown in FIG. 5, a method 500 begins at a step 502, where a health check application 218 receives a set of validation results 308 associated with a forwarding destination. In some embodiments, the set of validation results 308 include data indicating the result of transmitting one or more DNS queries to the DNS server from one or more target DNS servers. Additionally, in some embodiments, the set of validation results 308 includes network log data associated with transmitting the one or more DNS queries to the forwarding server.

At step 504, the health check application 218 determines, based on the set of validation results 308, whether one or more target DNS servers failed for the forwarding destination. Determining a number of target DNS servers that failed for a forwarding destination is performed in a manner similar to that discussed above with respect to results analysis module 310.

In some embodiments, determining whether a target DNS server failed for the forwarding destination includes determining a number of DNS queries transmitted from the target DNS server that were unsuccessful. In some embodiments, health check application 218 determines that a target DNS server failed if all DNS queries transmitted from the target DNS server were unsuccessful.

If more than one DNS server failed for the forwarding destination, then the method proceeds to step 506, where health check application 218 identifies an issue associated with degraded resiliency.

At step 508, health check application 218 determines whether all but one DNS server failed for the forwarding destination. In some embodiments, determining whether all but one DNS server failed includes determining a first number of DNS servers that failed and a second number of DNS servers that include the forwarding destination in the corresponding DNS configuration information. Health check application 218 compares the first number of DNS servers and the second number of DNS servers. In some embodiments, health check application 218 determines a number of DNS servers that succeeded. Health check application 218 determines whether only one DNS server succeeded for the forwarding destination.

If all but one DNS server failed for the forwarding destination (or optionally, only one DNS server succeeded), then the method proceeds to step 510, where health check application 218 identifies an issue associated with loss of high availability.

At step 512, health check application 218 determines whether all DNS servers failed for the forwarding destination. In some embodiments, determining whether all DNS servers failed for a forwarding destination includes determining a first number of DNS servers that failed and a second number of DNS servers that include the forwarding destination in the corresponding DNS configuration information. Health check application 218 compares the first number of DNS servers and the second number of DNS servers. In some embodiments, health check application 218 determines a number of DNS servers that succeeded. Health check application 218 determines whether no DNS servers succeeded for the forwarding destination.

If all but one DNS server failed for the forwarding destination (or optionally, no DNS servers succeeded), then the method proceeds to step 514, where health check application 218 identifies an issue associated with outdated DNS information.

In some embodiments, determining the number of DNS servers that failed and the number of DNS servers that succeeded is performed with respect to a given domain name. In such embodiments, the steps 504-512 are repeated for each domain name included in a plurality of target domain names.

At step 516, health check application 218 determines, based on the set of validation results 308, whether network log data (such as firewall logs, forwarding logs, or router logs) corresponding to the forwarding destination includes one or more entries indicating dropped forwarding traffic. If the network log data includes network log entries indicating dropped forwarding traffic, then the method proceeds to step 518, where health check application 218 identifies an issue associated with dropped traffic.

As shown in FIG. 5, the method 500 returns to step 502, where health check application 218 receives a set of validation results associated with the next forwarding destination included in the set of target DNS elements 304.

As discussed above, after identifying one or more issues associated with a forwarding destination, health check application 218 can generate one or more corresponding actions 312 and/or include the identified issues in a report 314.

Figure 6:
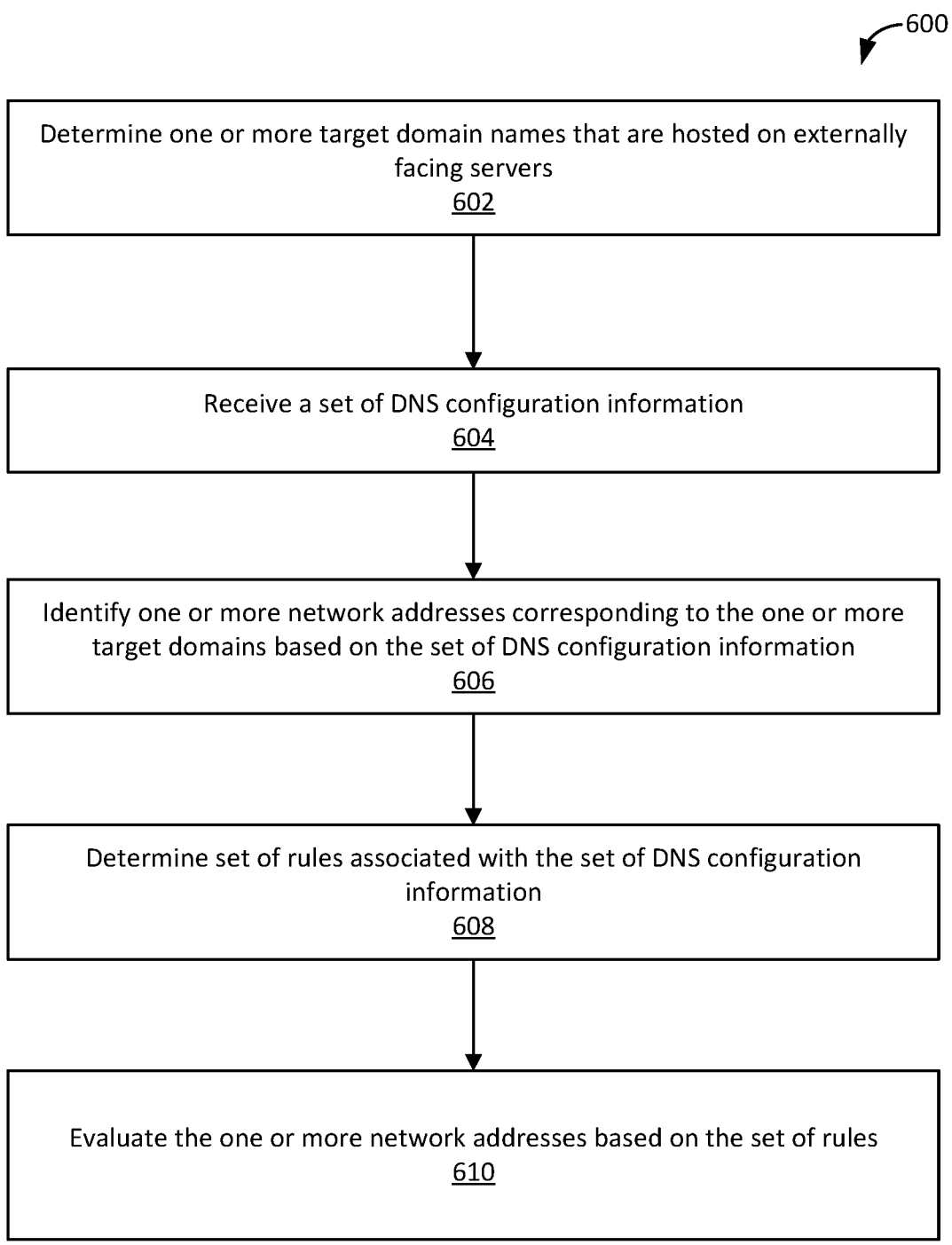
FIG. 6 is a flowchart of method steps for detecting issues associated with private addressing on public domains, according to various embodiments.

FIG. 6 is a flowchart of method steps for detecting issues associated with private addressing on public domains, according to various embodiments. Although the method steps are described in conjunction with the systems of FIGS. 1-3, persons skilled in the art will understand that any system configured to perform the method steps in any order falls within the scope of the present disclosure.

As shown in FIG. 6, a method 600 begins at step 602, where a health check application 218 determines one or more target domain names that are hosted on externally-facing servers. In some embodiments, health check application 218 receives or retrieves data specifying the one or more target domain names, for example, via user input, a configuration file, and/or the like.

At step 604, the health check application 218 receives a set of DNS configuration information 112. In some embodiments, health check application 218 receives the set of DNS configuration information 112 from a plurality of target DNS servers.

At step 606, the health check application 218 identifies one or more network addresses corresponding to the one or more target domain names based on the set of DNS configuration information 112. In some embodiments, health check application 218 parses the set of DNS configuration information 112 to identify DNS records associated with the one or more target domain names. If a DNS record specifies a network address corresponding to a target domain name included in the one or more target domain names, then health check application 218 includes the specified network address in the one or more network addresses. If a DNS record specifies a network address corresponding to a DNS server that includes information associated with a target domain name included in the one or more target domain names, then health check application 218 performs one or more DNS queries based on the network address to determine the network address corresponding to the target domain name.

At step 608, the health check application 218 determines a set of rules associated with the set of DNS configuration information 112. In some embodiments, the set of rules indicate one or more types of network addresses that should not be used in conjunction with a public domain name. For example, the set of rules could indicate that private network addresses or other types of addressing reserved for private use, such as private IPV6, private multicast, and/or the like should not be used. In some embodiments, each rule includes pattern matching information that specifies a pattern associated with the one or more types of network addresses.

At step 610, the health check application 218 evaluates the one or more network addresses based on the set of rules. Evaluating the one or more network addresses based on the set of rules includes determining, for each network address included in the one or more network addresses, whether the network address violates any rules included in the set of rules. In some embodiments, evaluating a network address includes performing one or more pattern matching operations between the network address and the pattern matching information specified by a rule.

As discussed above, after identifying network addresses that violate one or more rules, health check application 218 can generate one or more corresponding actions 312 and/or include the identified network address in a report 314.

In sum, a health check application receives a set of target domain names and a set of DNS configuration information. The health check application generates, based on the set of target domain names and the set of DNS configuration information, a plurality of DNS ecosystem elements that should be tested. The health check application performs one or more validation operations on the plurality of DNS ecosystem elements to generate a set of validation results.

The health check application analyzes the set of validation results to identify issues associated with the DNS ecosystem. Analyzing the set of validation results includes determining whether different DNS servers successfully connected to DNS ecosystem elements included in the plurality of DNS ecosystem elements. Additionally, the health check application analyzes network addresses provided by the plurality of DNS ecosystem elements for the set of target domain names to determine whether any private network addresses are associated with a public-facing domain name. If the health check application identifies any issues associated with the DNS ecosystem, the health check application generates one or more actions to resolve the identified issues.

At least one technical advantage of the disclosed techniques relative to the prior art is that, using the disclosed techniques, issues associated with a DNS ecosystem are identified more efficiently and accurately. In particular, by generating a list of DNS ecosystem elements (e.g., servers, server configurations, and network address information) that are associated with a set of target domain names, the portion of the DNS ecosystem associated with the set of target domain names can be quickly identified and validated to determine whether there are any issues within the DNS ecosystem associated with the set of target domain names. Furthermore, because individual elements are being validated, a health check server is able to identify specific elements that are associated with an issue or potential issue. Accordingly, using the disclosed techniques, a health check server is able to pre-emptively identify issues within the DNS ecosystem, even when results are being successfully returned for a target domain name. These technical advantages represent one or more technological improvements over prior art approaches.

1. In some embodiments, a computer-implemented method for identifying issues associated with a domain name system (DNS) ecosystem receiving a first target domain name, identifying a plurality of DNS elements included in the DNS ecosystem that should be tested based on the first target domain name, performing one or more validation operations on the plurality of DNS elements based on the first target domain name to generate a first set of validation results, and identifying a first DNS issue associated with the first target domain name based on the first set of validation results.

2. The computer-implemented method of clause 1, wherein identifying the plurality of DNS elements comprises receiving a set of DNS configuration information that specifies the plurality of DNS elements.

3. The computer-implemented method of clause 1 or 2, wherein the plurality of DNS elements include one or more of a zone transfer source, a forwarding destination, or a delegation destination.

4. The computer-implemented method of any of clauses 1-3, wherein the one or more validation operations include, for each DNS element, determining whether a target DNS server can connect to the DNS element.

5. The computer-implemented method of any of clauses 1-4, wherein the one or more validation operations include, for each DNS element, transmitting a DNS query for the first target domain name from a target DNS server to the DNS element.

6. The computer-implemented method of any of clauses 1-5, wherein the first set of validation results includes one or more network log entries, wherein identifying the first DNS issue comprises determining that a first network log entry included in the one or more network log entries indicates dropped traffic associated with performing the one or more validation operations.

7. The computer-implemented method of any of clauses 1-6, wherein the first set of validation results indicates, for each DNS server included in one or more DNS servers, whether the DNS server successfully performed a DNS query for the first target domain name using a first DNS element included in the plurality of DNS elements.

8. The computer-implemented method of any of clauses 1-7, wherein identifying the first DNS issue comprises determining a number of DNS servers included in the one or more DNS servers that successfully performed the DNS query.

9. The computer-implemented method of any of clauses 1-8, wherein identifying the first DNS issue comprises determining a number of DNS servers included in the one or more DNS servers that did not successfully perform the DNS query.

10. The computer-implemented method of any of clauses 1-9, further comprising determining one or more actions to perform based on the first DNS issue.

11. In some embodiments, one or more non-transitory computer-readable media include instructions that, when executed by one or more processors, cause the one or more processors to perform the steps of receiving a first target domain name, identifying a plurality of DNS elements included in a DNS ecosystem that should be tested based on the first target domain name, performing one or more validation operations on the plurality of DNS elements based on the first target domain name to generate a first set of validation results, and identifying a first DNS issue associated with the first target domain name based on the first set of validation results.

12. The one or more non-transitory computer-readable media of clause 11, wherein identifying the plurality of DNS elements comprises identifying one or more target DNS servers and receiving, from each target DNS server included in the one or more target DNS servers, configuration information corresponding to the target DNS server.

13. The one or more non-transitory computer-readable media of clause 11 or 12, wherein the one or more validation operations include determining a set of DNS configuration rules and validating the configuration information corresponding to a first target DNS server included in the one or more target DNS servers based on the set of DNS configuration rules.

14. The one or more non-transitory computer-readable media of any of clauses 11-13, wherein the one or more validation operations include, for each DNS element, determining whether a target DNS server can connect to the DNS element.

15. The one or more non-transitory computer-readable media of any of clauses 11-14, wherein the one or more validation operations include, for each DNS element, transmitting a DNS query for the first target domain name from a target DNS server to the DNS element.

16. The non-transitory computer-readable media of any of clauses 11-15, wherein the one or more validation operations includes determining one or more network addresses corresponding to the first target domain name and, for each network address included in the one or more network addresses, determining whether the network address matches at least one DNS configuration rule included in a set of DNS configuration rules.

17. The non-transitory computer-readable media of any of clauses 11-16, wherein the first target domain name is a public domain name, and wherein the at least one DNS configuration rule specifies a network address pattern associated with a private network address.

18. The non-transitory computer-readable media of any of clauses 11-17, wherein the first set of validation results indicates, for each DNS server included in one or more DNS servers, whether the DNS server successfully performed a DNS query for the first target domain name using a first DNS element included in the plurality of DNS elements.

19. The non-transitory computer-readable media of any of clauses 11-18, wherein identifying the first DNS issue comprises determining that one or more DNS servers did not successfully perform the DNS query based on the first set of validation results.

20. In some embodiments, a system comprises one or more memories storing instructions; and one or more processors that are coupled to the one or more memories and, when executing the instructions, are configured to receive a first target domain name, identify a plurality of DNS elements included in a DNS ecosystem that should be tested based on the first target domain name, perform one or more validation operations on the plurality of DNS elements based on the first target domain name to generate a first set of validation results, and identify a first DNS issue associated with the first target domain name based on the first set of validation results.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for identifying issues associated with a domain name system (DNS) ecosystem, the method comprising:
   receiving a first target domain name;
   determining a set of target DNS servers included in the DNS ecosystem;
   transmitting one or more requests to each of the set of target DNS servers for DNS configuration information managed by the set of target DNS servers, wherein the DNS configuration information comprises information associated with a plurality of target domain names;
   identifying a plurality of DNS elements included in the DNS ecosystem that should be tested based on the first target domain name and the DNS configuration information managed by the target DNS servers;
   performing one or more validation operations on the plurality of DNS elements based on the first target domain name to generate a first set of validation results; and identifying a first DNS issue associated with the first target domain name based on the first set of validation results.

2. The computer-implemented method of claim 1, wherein identifying the plurality of DNS elements comprises parsing a subset of the DNS configuration information received from a DNS server included in the set of target DNS servers to identify one or more DNS elements that are associated with the first target domain name.

3. The computer-implemented method of claim 1, wherein the plurality of DNS elements include one or more of a zone transfer source, a forwarding destination, or a delegation destination.

4. The computer-implemented method of claim 1, wherein the one or more validation operations include, for each DNS element included in the plurality of DNS elements, determining whether a target DNS server included in the set of target DNS servers can connect to the DNS element.

5. The computer-implemented method of claim 1, wherein the one or more validation operations include, for each DNS element included in the plurality of DNS elements, transmitting a DNS query for the first target domain name from a target DNS server included in the set of target DNS servers to the DNS element.

6. The computer-implemented method of claim 1, wherein the first set of validation results includes one or more network log entries, wherein identifying the first DNS issue comprises determining that a first network log entry included in the one or more network log entries indicates dropped traffic associated with performing the one or more validation operations.

7. The computer-implemented method of claim 1, wherein the first set of validation results indicates, for each DNS server included in the set of target DNS servers, whether the DNS server successfully performed a DNS query for the first target domain name using a first DNS element included in the plurality of DNS elements.

8. The computer-implemented method of claim 7, wherein identifying the first DNS issue comprises determining a number of DNS servers included in the set of target DNS servers that successfully performed the DNS query.

9. The computer-implemented method of claim 7, wherein identifying the first DNS issue comprises determining a number of DNS servers included in the set of target DNS servers that did not successfully perform the DNS query.

10. The computer-implemented method of claim 1, further comprising causing one or more actions to be performed based on the first DNS issue.

11. One or more non-transitory computer-readable media including instructions that, when executed by one or more processors, cause the one or more processors to perform the steps of:
receiving a first target domain name;
determining a set of target DNS servers included in the DNS ecosystem;
transmitting one or more requests to each of the set of target DNS servers for DNS configuration information managed by the set of target DNS servers, wherein the DNS configuration information comprises information associated with a plurality of target domain names;
identifying a plurality of DNS elements included in the DNS ecosystem that should be tested based on the first target domain name and the DNS configuration information;
performing one or more validation operations on the plurality of DNS elements based on the first target domain name to generate a first set of validation results; and
identifying a first DNS issue associated with the first target domain name based on the first set of validation results.

12. The one or more non-transitory computer-readable media of claim 11, wherein identifying the plurality of DNS elements comprises parsing a subset of the DNS configuration information received from a DNS server included in the set of target DNS servers for one or more DNS elements that are (i) associated with the first target domain name.

13. The one or more non-transitory computer-readable media of claim 12, wherein the one or more validation operations include validating a subset of the DNS configuration information corresponding to a first target DNS server included in the set of target DNS servers based on a set of DNS configuration rules.

14. The one or more non-transitory computer-readable media of claim 11, wherein the one or more validation operations include, for each DNS element included in the plurality of DNS elements, determining whether a target DNS server included in the set of target DNS servers can connect to the DNS element.

15. The one or more non-transitory computer-readable media of claim 11, wherein the one or more validation operations include, for each DNS element included in the plurality of DNS elements, transmitting a DNS query for the first target domain name from a target DNS server included in the set of target DNS servers to the DNS element.

16. The non-transitory computer-readable media of claim 11, wherein the one or more validation operations include determining one or more network addresses corresponding to the first target domain name and, for each network address included in the one or more network addresses, determining whether the network address matches at least one DNS configuration rule included in a set of DNS configuration rules.

17. The non-transitory computer-readable media of claim 16, wherein the first target domain name is a public domain name, and wherein the at least one DNS configuration rule specifies a network address pattern associated with a private network address.

18. The non-transitory computer-readable media of claim 11, wherein the first set of validation results indicates, for each DNS server included in the set of target DNS servers, whether the DNS server successfully performed a DNS query for the first target domain name using a first DNS element included in the plurality of DNS elements.

19. The non-transitory computer-readable media of claim 18, wherein identifying the first DNS issue comprises determining that one or more DNS servers included in the set of target DNS servers did not successfully perform the DNS query based on the first set of validation results.

20. A system comprising:
one or more memories storing instructions;
one or more processors that are coupled to the one or more memories and, when executing the instructions, are configured to:
receive a first target domain name;
determine a set of target DNS servers included in the DNS ecosystem;
transmit one or more requests to each of the set of target DNS servers for DNS configuration information managed by the set of target DNS servers, wherein the DNS configuration information comprises information associated with a plurality of target domain names;

identify a plurality of DNS elements included in the DNS ecosystem that should be tested based on the first target domain name and the DNS configuration information;

perform one or more validation operations on the plurality of DNS elements based on the first target domain name to generate a first set of validation results; and identify a first DNS issue associated with the first target domain name based on the first set of validation results.

* * * * *